(No Model.)

C. J. GRELLNER.
HAMMER.

No. 261,338. Patented July 18, 1882.

WITNESSES
Fred. G. Dieterich.
P. C. Dieterich.

Christopher J. Grellner.
INVENTOR,
by Louis Bagger & Co.
Attorneys

N. PETERS. Photo-Lithographer, Washington, D. C.

UNITED STATES PATENT OFFICE.

CHRISTOPHER J. GRELLNER, OF ST. LOUIS, MISSOURI.

HAMMER.

SPECIFICATION forming part of Letters Patent No. 261,338, dated July 18, 1882.

Application filed March 11, 1882. (No model.)

*To all whom it may concern:*

Be it known that I, CHRISTOPHER J. GRELLNER, of St. Louis, in the county of St. Louis and State of Missouri, have invented certain new and useful Improvements in Hammers; and I do hereby declare that the following is a full, clear, and exact description of the invention, which will enable others skilled in the art to which it appertains to make and use the same, reference being had to the accompanying drawings, which form a part of this specification, and in which—

Figure 1:
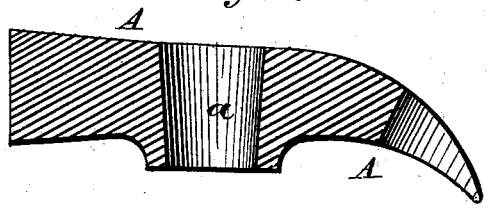
Figure 2:
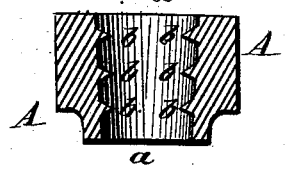
Figure 3:
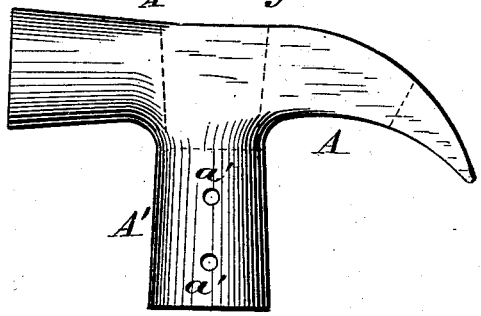
Figure 4:
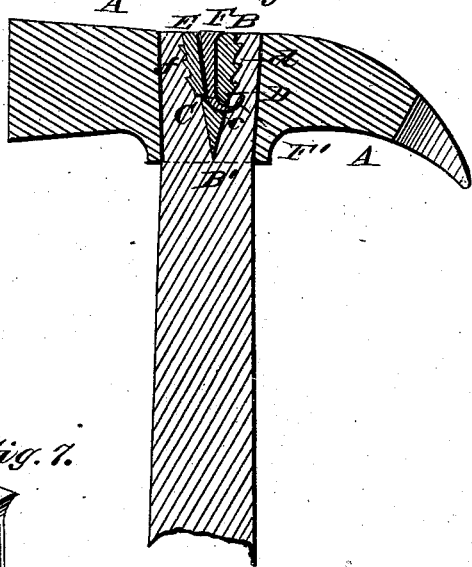
Figures 5, 6, 7:
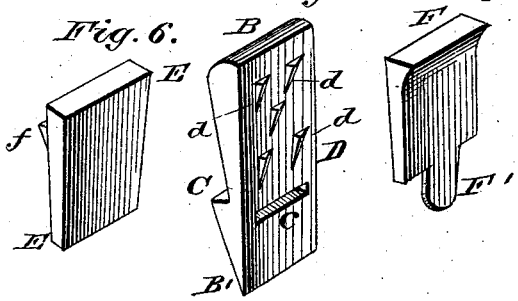

Figure 1 is a longitudinal section of a hammer-head adapted for my improvement. Fig. 2 is a cross-section of the same through the eye. Fig. 3 is a side view of a head of a somewhat modified construction. Fig. 4 is a sectional view of the hammer-head, showing my improved compound wedge inserted and driven home; and Figs. 5, 6, and 7 are perspective detail views of the component parts of the wedge.

Similar letters of reference indicate corresponding parts in all the figures.

My invention has relation to means for fastening the heads of hammers, axes, mallets, and similar tools permanently upon their handles; and to this end it consists in the construction and combination of parts of a compound wedge which can be easily applied, and forms an absolute security against the head coming off of the handle accidentally and the dislodgment of the wedge.

By reference to the drawings it will be seen that the hammer-head A (which may of course be of any desired size, shape, and construction) is made with a tapering eye, $a$, with or without a downward-projecting re-enforcing sleeve, A'. I prefer to "set up" the inside of the eye with rasp-like points or projections, as shown at $b$ in Fig. 2; but this is not necessary, although advantageous in sledge-hammers, where the tendency of the head to fly off of its handle is very considerable.

My compound wedge is composed of three parts, made of metal, and shown in detail in Figs. 5, 6, and 7. The wedge proper is shown at B, and is cut off on one side to form an offset or shoulder, C, some distance above its point B', with an inclined slot or opening, $c$, passing through the part D, which forms the portion of the wedge-body above shoulder C. On its straight outer face the wedge is set up to form rasp-like teeth or projections $d$. After the handle has been inserted into the eye the wedge B C D is inserted and driven partially home, to be followed by the wedge E, which has teeth or projections $f$ on its outer face. Next, the two wedges B C D and E are forced apart by the insertion of the finishing-wedge F, which terminates in a rounded point, F', of such dimensions that it will readily enter the inclined slot $c$ in B. It will be seen that the top of the last-named wedge, B C D, is rounded off on one side, facing F, so as to form a small space between it and E for the insertion of the point of F, which may thus readily be driven home between the two, the contiguous face of wedge F being concaved to fit the upper rounded part of B C D, and thus when the three parts are placed in juxtaposition to one another and driven home they form a compact and solid whole, as clearly shown in Fig. 4 of the drawings. The point F', after passing through the slot $c$, enters the wood of the contiguous part of the hammer-handle, forming a spur or projection which makes it impossible for the wedge to come out. Additional means of fastening are afforded by the teeth $d$ and $f$; but these may be dispensed with, if desired. Where the hammer-eye is small the intermediate wedge, F, may also be dispensed with, as the remaining two parts of my compound wedge will clamp the wood sufficiently to form an absolutely safe means of attachment of the head upon its handle.

As an additional security, the eye $a$ may be elongated downwardly to form a sleeve, A', having a series of apertures, $a'$, for the insertion of short nails or screws transversely into the wood of the handle.

By the use of my compound wedge there is no danger of splitting or otherwise injuring the hammer or mallet head, as where broad single wedges are used; and it is also obvious that it is much easier to drive my compound wedge into the wood of the handle, and that after it is once in its place there is no possibility of the accidental detachment of the hammer-head from its handle.

I am aware that it is not new to construct hammers and tools of a like character with a downward-projecting sleeve for the better attachment of the hammer-head upon its handle, and I do not therefore claim such construction, broadly; but

What I claim, and desire to secure by Letters Patent of the United States, is—

1. The compound wedge composed of the shouldered part B C D, slotted obliquely at c, wedge E, and intermediate wedge, F, having point F', constructed and combined substantially as and for the purpose herein shown and set forth.

2. In a hammer, the combination, with the head having a tapering eye, a, and its handle inserted into said eye, of the compound wedge composed of the shouldered part B C D, slotted obliquely at c, auxiliary wedge E, and intermediate wedge, F, with its point F' inserted through the slotted part B C D, substantially as and for the purpose herein shown and set forth.

In testimony that I claim the foregoing as my own I have hereunto affixed my signature in presence of two witnesses.

CHRISTOPHER JOS. GRELLNER.

Witnesses:
JOS. W. PETERSEN,
JULIUS J. WESSELS.